No. 128,636

UNITED STATES PATENT OFFICE.

ADRIAN KLOEZEWSKI AND DEMETRY MINDELEFF, OF WASHINGTON, D. C.

IMPROVEMENT IN THE MANUFACTURE OF FUEL FROM COAL-DUST, &c.

Specification forming part of Letters Patent No. 128,636, dated July 2, 1872.

SPECIFICATION.

*To all to whom it may concern:*

Be it known that we, A. KLOEZEWSKI and D. MINDELEFF, of Washington city, District of Columbia, have invented certain new and useful Improvements in Artificial Fuel; and we do hereby declare that the following is a full, clear, and exact description thereof, reference being had to the accompanying drawing and to the letters of reference marked thereon which form a part of this specification.

The nature of our invention consists in a composition to be mixed with coal-dust for forming the same into artificial fuel, or as we term it "concrete-coal," as will be hereinafter more fully set forth.

In order to enable others skilled in the art to which our invention appertains to make and use the same, we will now proceed to describe the manner in which our concrete-coal is or may be made.

We use the following ingredients in about the following proportions: To two thousand pounds of coal-dust we take fifty pounds of calcined dolomite, eight pounds dry carbonate of soda, four pounds carbonate of potash, thirty pounds powdered glass, and four pounds coal-oil tar. We do not, however, confine ourselves exclusively to these particular proportions, as they might be varied according to the qualtity of fuel desired, or for other reasons. We prepare first a solution of glass and tar, by mixing very fine powdered glass or flint with potash (caustic) and soda in an iron vessel, and heating the same until it is melted together. After this has cooled an equal quantity of water is added, and again heated till it is entirely dissolved; the coal-oil tar is added and the whole boiled for a few minutes longer, or until the tar combines with the alkali. This mass is then mixed with six parts of water. Commercial silicate of potash and soda may be used for the same purpose by the addition of coal-oil tar, heating and stirring the mixture well. Dry coal-dust is well mixed with fresh calcined dolomite or hydraulic cement in a very fine powder, and then mixed with the glass and tar solution, after which it is stamped or pressed into small cakes or big lumps, as desired, and dried, when it is ready for use; or, it may be moistened first for a few hours in a solution of dolomite in muriatic acid and then dried. Dolomite or hydraulic cement in the presence of or combined with potash, soda, and tar, forms a non-soluble silicate of alumina, lime, and magnesia, which after drying cements the fragments of coal and makes it solid and compact. The tar also adds to the combustible character of the fuel.

Having thus fully described our invention, what we claim as new, and desire to secure by Letters Patent, is—

1. The within described composition, composed substantially of the ingredients herein mentioned, for the purpose of mixing with coal-dust, and forming thereof an article of artificial fuel called concrete-coal, as set forth.

2. As an article of manufacture, an artificial fuel called concrete-coal, formed of coal-dust mixed with the composition herein described, substantially in the manner set forth.

In testimony that we claim the foregoing as our own we affix our signatures in presence of two witnesses.

ADRIAN KLOEZEWSKI.
DEMETRY MINDELEFF.

Witnesses:
EDM. F. BROWN,
T. H. ALEXANDER.